`US008320533B2`

(12) United States Patent
Waters

(10) Patent No.: US 8,320,533 B2
(45) Date of Patent: Nov. 27, 2012

(54) SYSTEM AND METHOD FOR REPLYING TO VOICE MESSAGES LEFT BY CALLERS

(75) Inventor: Christopher Michael Waters, Burlingame, CA (US)

(73) Assignee: Ribbit Corporation, Mountain View, CA (US)

( * ) Notice: Subject to any disclaimer, the term of this patent is extended or adjusted under 35 U.S.C. 154(b) by 946 days.

(21) Appl. No.: 12/393,323

(22) Filed: Feb. 26, 2009

(65) Prior Publication Data

US 2009/0220057 A1    Sep. 3, 2009

Related U.S. Application Data

(60) Provisional application No. 61/067,093, filed on Feb. 26, 2008.

(51) Int. Cl.
*H04M 11/00* (2006.01)
*H04L 1/16* (2006.01)

(52) U.S. Cl. .............. 379/88.13; 370/235; 379/88.14; 379/88.18; 379/88.25; 455/432.1; 455/433; 455/466; 705/38; 709/200; 709/206; 709/207; 713/170

(58) Field of Classification Search .................. 370/235; 379/88.13, 88.14, 88.18, 88.25; 455/432.1, 455/433, 466; 705/38; 709/200, 206, 207; 713/170
See application file for complete search history.

(56) References Cited

U.S. PATENT DOCUMENTS

| | | | |
|---|---|---|---|
| 5,812,639 A | | 9/1998 | Bartholomew et al. |
| 5,953,393 A | * | 9/1999 | Culbreth et al. ........... 379/88.25 |
| 6,061,432 A | * | 5/2000 | Wallace et al. ............ 379/88.18 |
| 6,292,823 B1 | * | 9/2001 | Hjalmtysson ................ 709/200 |
| 6,910,042 B2 | * | 6/2005 | Albaugh et al. ........................ 1/1 |
| 7,133,687 B1 | * | 11/2006 | El-Fishawy et al. .......... 455/466 |
| 7,224,991 B1 | * | 5/2007 | Fuoss et al. .................... 455/466 |
| 7,539,730 B2 | * | 5/2009 | Adams et al. ................. 709/206 |
| 7,584,254 B2 | * | 9/2009 | Adams et al. ................. 709/206 |

(Continued)

FOREIGN PATENT DOCUMENTS

WO    WO-2009108316 A1    9/2009

OTHER PUBLICATIONS

"International Application Serial No. PCT/US2009/001194, International Search Report mailed Apr. 3, 2009", 2 pgs.

(Continued)

*Primary Examiner* — Gerald Gauthier

(74) *Attorney, Agent, or Firm* — Schwegman Lundberg & Woessner P.A.

(57) ABSTRACT

An exemplary system and associated method for a communications system allowing responses to messages in an electronic environment are disclosed. The communications need not be based on the same platform or carrier. The system comprises a processing center to couple to a telephony network where the processing center provides a sender, not subscribed to the system, with messaging capabilities. The processing center includes a voice mail server to record a message from the sender and retrieve the message for a recipient that is subscribed to the system. A call processing logic module is arranged to access a database to determine whether a telephony device used by the sender has non-voice capabilities. The call processing logic module can notify the recipient of the message and informs the recipient of the capabilities of the sender to allow various response modalities (e.g., by voice mail, e-mail, or text message).

20 Claims, 5 Drawing Sheets

U.S. PATENT DOCUMENTS

| | | | |
|---|---|---|---|
| 7,730,143 B1* | 6/2010 | Appelman | 709/206 |
| 8,121,625 B2* | 2/2012 | Carroll | 455/466 |
| 8,156,193 B1* | 4/2012 | Odell et al. | 709/207 |
| 2004/0132449 A1* | 7/2004 | Kowarsch | 455/432.1 |
| 2004/0139163 A1* | 7/2004 | Adams et al. | 709/206 |
| 2005/0097032 A1* | 5/2005 | Benco et al. | 705/38 |
| 2006/0179114 A1* | 8/2006 | Deeds | 709/206 |
| 2006/0200490 A1* | 9/2006 | Abbiss | 707/102 |
| 2006/0209695 A1* | 9/2006 | Archer et al. | 370/235 |
| 2006/0293050 A1* | 12/2006 | Chambers et al. | 455/433 |
| 2007/0242809 A1 | 10/2007 | Mousseau et al. | |
| 2008/0025295 A1 | 1/2008 | Elliott et al. | |
| 2008/0043939 A1 | 2/2008 | Sipher | |
| 2008/0317222 A1* | 12/2008 | Griggs et al. | 379/88.14 |
| 2009/0031130 A1* | 1/2009 | Hirano et al. | 713/170 |
| 2009/0220057 A1* | 9/2009 | Waters | 379/88.13 |

OTHER PUBLICATIONS

"International Application Serial No. PCT/US2009/001194, Written Opinion mailed Apr. 3, 2009", 8 pgs.

* cited by examiner

SYSTEM AND METHOD FOR REPLYING TO VOICE MESSAGES LEFT BY CALLERS

CROSS-REFERENCE TO RELATED APPLICATION

This application claims priority benefit of U.S. Provisional Application No. 61/067,093, entitled, "Method for Replying by Voice to Voice Message Left by Callers from Short Message Service Addressable Endpoints," filed Feb. 26, 2008 and incorporated herein by reference in its entirety.

TECHNICAL FIELD

The present application relates generally to the field of telecommunications, and, in a specific exemplary embodiment, to a system and method of messaging services in telephone or Internet systems.

BACKGROUND

Voice messaging systems generally have remained substantially unchanged over the past few decades. The systems are typically incapable of allowing message recipients to reply to message senders unless the sender and the recipient each share the same voice messaging platform (such as in, for example, enterprise systems in a corporate environments).

Further, mobile and fixed-line voice messaging systems are typically independent and do not interoperate. Thus, message recipients cannot reply to message senders. In order to facilitate asynchronous voice messaging, the recipients must discontinue message retrieval sessions and place a separate outgoing call to the sender. The recipient can then either communicate directly with the sender or reach the sender's voice messaging system where the recipient is only then able to leave a reply message.

Asynchronous messaging can be further enhanced by message threading. Typically, only closed messaging systems (such as the enterprise system discussed above) provide message threading. Open messaging systems such as those provided by consumer fixed and mobile service providers (i.e., telephony service carriers) are unable to reply across system domains or to thread replies.

BRIEF DESCRIPTION OF DRAWINGS

Various ones of the appended drawings merely illustrate exemplary embodiments of the present invention and cannot be considered as limiting its scope.

DETAILED DESCRIPTION

Figure 1:
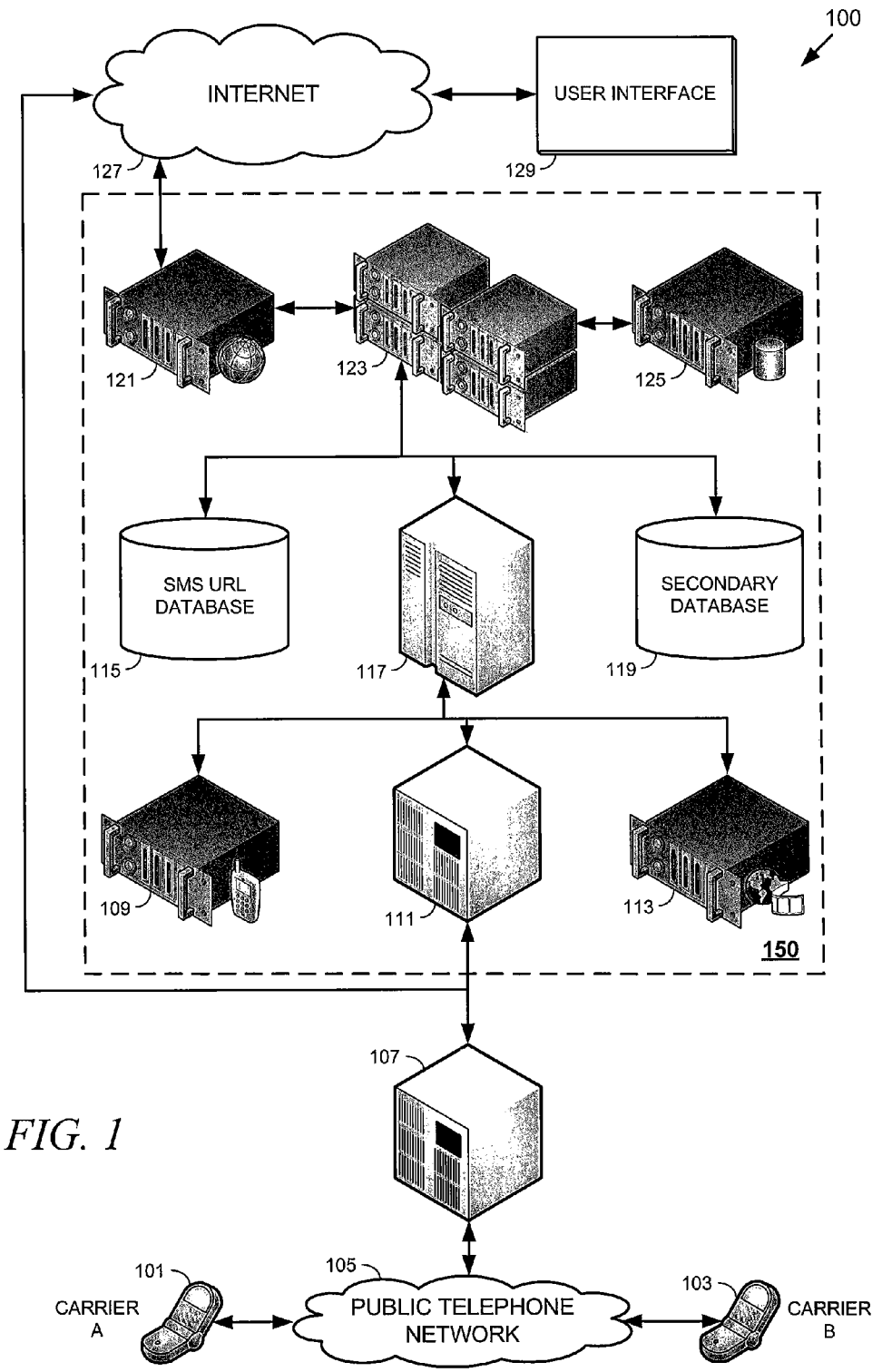
FIG. 1 is a network diagram of an exemplary messaging system used to process and relay messages.

The description that follows includes illustrative systems, methods, techniques, instruction sequences, and computing machine program products that embody at least portions of various embodiments of the present invention. In the following description, for purposes of explanation, numerous specific details are set forth to provide an understanding of the various embodiments of the inventive subject matter presented herein. However, a skilled artisan will recognize that the various embodiments may be practiced without these specific details. Further, independently well-known instruction instances, protocols, structures, network architectures, and techniques have not been shown in detail.

As used herein, the term "or" may be construed in either an inclusive or exclusive sense. Similarly, the term "exemplary" is to be construed merely to mean an example of something or an exemplar and not necessarily a preferred or ideal means of accomplishing a goal. Additionally, although various exemplary embodiments discussed below focus on particular aspects of messaging systems and methods, the embodiments are given merely for clarity in disclosure. Thus, any type of hardware, firmware, and software combinations, including various central and distributed system architectures, can employ various embodiments of the messaging system and method described herein and are considered as being within a scope of the present invention.

Particular embodiments of the present invention relate generally to voice mail and the interaction of voice mail systems with mobile telephony systems. Other embodiments of the present invention generally relate to facilitating efficient asynchronous voice communication between parties across un-related messaging systems. Broadly stated, embodiments provided herein add telephony enabled threaded asynchronous and voice messaging capabilities to unconnected mobile and fixed-line systems where the original sender of the message is either known or unknown to the recipient.

An exemplary embodiment of a communications system, to allow responses to messages in an electronic environment, is disclosed. The communications need not be based on the same platform or carrier. The system includes a processing center to couple to a telephony network such as land-line telephones and cellular phones connected to a publicly switched telephony network or Internet-based phone systems. The processing center provides a sender, which is not subscribed to the system, with messaging capabilities to and from a recipient that is subscribed to the system. The processing center includes a voice mail server to record a message from the sender and retrieve the message for the recipient. A call processing logic module is coupled to the voice mail server. After the sender leaves a message, the call processing logic module accesses a database to determine whether the telephony device used by the sender has non-voice capabilities, such as an SMS URL address or multimedia messaging service (MMS) capabilities. The call processing logic module both notifies the recipient of the message and informs the recipient of the capabilities of the telephony device. Depending on the capabilities of the sender's telephony device, the recipient can respond to the message by various modalities such as, e-mail, voice mail, or text.

An exemplary embodiment of method allowing responses to messages in an electronic environment is further disclosed. The method includes recording a message to a subscribed recipient from a non-subscribed sender and determining whether a telephony device used by the sender has non-voice capabilities such as e-mail capabilities or text messaging functions. The recipient of the message is notified and informed of the capabilities of the telephony device to allow an appropriate response format. Again, depending on the capabilities of the sender's telephony device, the recipient can respond to the message by, for example, e-mail, voice mail, or text.

An exemplary embodiment of a method allowing responses to messages in an electronic environment is also disclosed. The method includes recording and storing one or more voice mail messages in a voice mailbox system of a system subscriber. The subscriber of the system is notified of the one or more voice mail messages being sent by a telephony device associated with the non-subscriber. The non-voice capabilities of the telephony device of the non-subscriber are evaluated. A temporary account is established for the non-subscriber and instructions are provided allowing the non-subscriber to access any responses received to the one or more voice mail messages.

An exemplary embodiment of a machine-readable storage medium (e.g., a DVD or CD-ROM) storing an instruction is disclosed such that, when executed by one or more processors controlling a communications system, causes the system to perform a method to allow responses to messages in an electronic environment. The method includes recording and storing one or more voice mail messages in a voice mailbox system of a system subscriber. The subscriber of the system is notified of the one or more voice mail messages being sent by a telephony device associated with the non-subscriber. The non-voice capabilities of the telephony device of the non-subscriber are evaluated. A temporary account is established for the non-subscriber and instructions are provided allowing the non-subscriber to access any responses received to the one or more voice mail messages.

Each of these exemplary embodiments, and others, are discussed in detail, below.

With reference now to FIG. 1, a network diagram of an exemplary messaging system 100 includes a first telephony device 101, a second telephony device 103, a publicly switched telephony network (PSTN) 105, and an SMS/MMS gateway 107. In this embodiment, the first 101 and second 103 telephony devices are based on different carrier networks (indicated as "Carrier A" and "Carrier B"). In this exemplary embodiment, the first telephony device 101 is associated with a sender that is not subscribed to the messaging system 100 and the second telephony device 103 is associated with a recipient subscribed to the messaging system 100. The first 101 and second 103 telephony devices are coupled through the PSTN 105 to the SMS/MMS gateway 107. The first 101 and second 103 telephony devices can take the form of cellular telephones, landline telephones, Internet-based telephones or end-points, or a variety of other telephony devices known independently in the art. The SMS/MMS gateway 107 is further coupled to one or more user interfaces 129 through the Internet 127.

A processing center 150 is coupled both to the PSTN 105 through the SMS/MMS gateway 107 and to the Internet 127. Although the processing center 150 includes a number of components, a skilled artisan will recognize that many of these components may be grouped within or as different portions of other hardware or software components. The skilled artisan will further recognize that components within the processing center 150 may geographically either be centralized or distributed. Further, the components may be dedicated to the processing center 150 or shared with other networks (not shown). For example, either an SMS URL database 115 or a secondary database 119, described below, can be a part of a national telephony directory system. Therefore, the arrangement of the processing center 150 is illustrated merely for convenient explanatory purposes.

The processing center 150 of the exemplary messaging system 100 includes a Web server 121 coupled to the Internet 127. An application server 123 is coupled to the Web server 121 and an e-mail server 125. The application server 123 is further coupled to the SMS URL database 115, a call processing logic module 117, and the secondary database 119. The call processing logic module 117 is further coupled to a voice mail server 109, a border gateway controller 111, and a media server 113. The border gateway controller 111 is, in turn, coupled to the SMS/MMS gateway 107.

In an embodiment of the exemplary messaging system 100, a sender places a call from the first telephony device 101 to a recipient on the second telephony device 103 over the PSTN 105. The call passes through the SMS/MMS gateway 107 and the border gateway controller 111 to the voice mail server 109. The voice mail server 109 records a message from the sender. The recorded message is either stored in the voice mail server 109 or in the secondary database 119.

After the sender leaves a voice message for the recipient, the recipient may be notified of the message in a number of ways, depending upon capabilities of the second telephony device 103. For example, the recipient can be notified via a message waiting indicator light, an SMS text message, an instant message, a web page update, or an e-mail.

In a specific exemplary embodiment, the call processing logic module 117 notifies the recipient using the second telephony device 103 of the presence of a new message via, for example, an e-mail sent through the e-mail server 125 or by a text message via the SMS/MMS gateway 107. The call processing logic module 117 checks the SMS URL database 115 to determine if the first telephony device 101 of the sender is addressable via a text message. The SMS URL database 115 associates the address of the first telephony device 101 with the sender's message. Alternatively or in addition, the call processing logic module 117 sets a flag associated with the sender's message indicating that the first telephony device 101 of the sender is addressable.

The recipient can retrieve the sender's message via any fixed-line or mobile PSTN coupled device, or by an Internet connected endpoint such as voice over Internet protocol (VoIP) systems. Moreover, devices including soft phones, voice over instant message clients, browser phones, wireless IP devices, and other Internet protocol (IP) connected end points, or other wired or wireless protocols can be utilized through, for example, the one or more user interfaces 129.

At anytime during or after playback of the sender's message, the recipient can signal the system to record a reply to the sender. The exemplary messaging system 100 interacts with the recipient much like any other voice message system to record a reply and accept a send command. When the message is sent, the system will attach the reply to the original message to create a message thread and notify the sender that a reply to the message is available.

The call processing logic module 117 also checks the secondary database 119 for the sender's contact information stored by the recipient. If the contact information includes one or more addresses, such as an e-mail address for the sender, the call processing logic module 117 associates the information with the sender's message. Alternatively or in addition, the call processing logic module 117 sets a flag associated with the sender's message indicating that the recipient is addressable.

The recipient on the second telephony device 103 places a call to the voice mail server 109 to retrieve the message. The voice mail server 109 presents the message via the media server 113. The voice mail server 109 recognizes the sender as being addressable and presents to the recipient an option of replying to the sender. If the recipient accepts the option, the voice mail server 109 records the recipient's reply.

The call processing logic module 117 then delivers notification of the reply message to the first telephony device 101 of the sender by the SMS/MMS gateway 107 and the PSTN 105. The call processing logic module 117 also causes the application server 123 to deliver an e-mail message over the Internet 127 to the one or more user interfaces 129 coupled to the Internet 127. The one or more user interfaces 129 can be connected to device endpoints such as Internet-based telephony systems (e.g., Skype®).

The text message notification of the recipient's reply contains, for example, the subject or sender of the message and a telephone number. The telephone number, when dialed from the first telephony device 101 (e.g., a mobile cellular phone) of the sender, will cause the recipient's reply message to be played by the voice mail server 109 or the media server 113. The text message or e-mail notification of the recipient's reply may also contain a text version of the reply message that has been transcribed from the audio file. Means for transcribing either audio or audio files to text are known independently in the art.

If the sender does not already have an account with the processing center 150, the application server 123 creates a temporary account either before, during, or immediately after the recipient chooses the option to reply to the sender. The application server 123 either directly transcribes the voice message to text or accesses a separate process (not shown) that transcribes the voice message to text.

The sender, after having received notification of the recipient's reply, can choose to gain audio access to the reply by calling the voice mail server 109 over the PSTN 105 by accessing the sender's account over the Internet 127. In the case of Internet access, the web server 121 communicates with the application server 123 to retrieve the sender's original message and the recipient's reply message from the secondary database 119.

Since a temporary account is created for the sender if needed, the sender, upon responding to the notification of a reply message and listening to the message, is able to reply in turn to the recipient. After listening to the reply message, the call processing logic module 117 will inform the sender that the message thread is viewable and retrievable over the Internet 127. The call processing logic module 117 will further inform the sender that, to learn how to retrieve or view the one or more messages, pressing a specific key will cause a text message to be delivered to the sender containing account login credentials.

While the exemplary messaging system 100 of FIG. 1 employs a client-server architecture, a skilled artisan will recognize that the present disclosure is not limited to such an architecture. The exemplary messaging system 100 could also be implemented in a distributed, or peer-to-peer, architecture system. Further, multiple servers, gateways, controllers, and modules in the processing center 150 can, in whole or in part, be implemented as standalone software programs.

Figure 2:
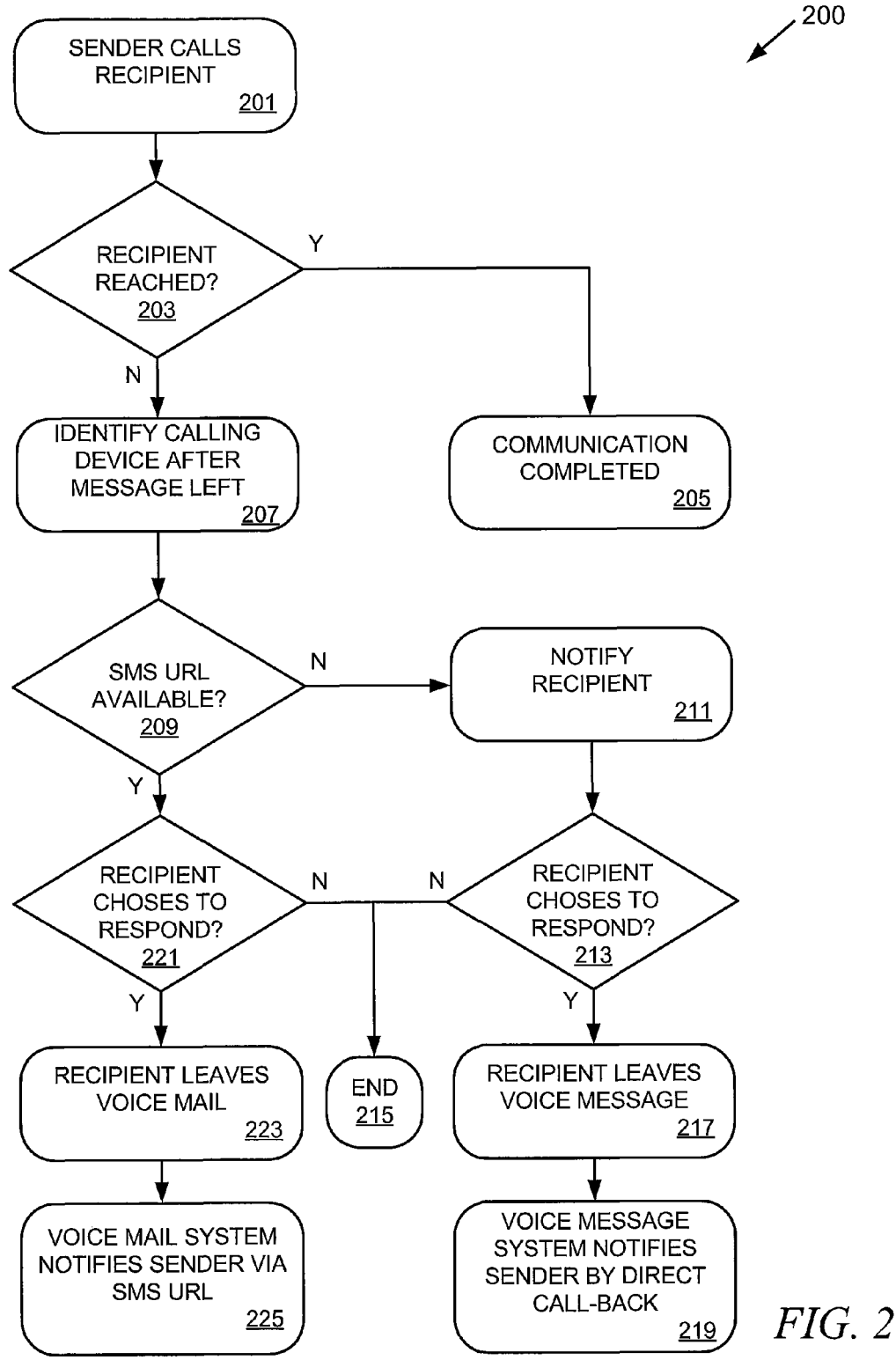
FIG. 2 is a messaging flowchart illustrating an exemplary method by which the messaging system of FIG. 1 is used to facilitate communications between two or more individuals where a determination is made whether the sender has a short message service uniform resource locator (SMS URL) addressable device.

Referring now to FIG. 2, a messaging flowchart 200 illustrates a specific exemplary embodiment of how the messaging system 100 of FIG. 1 is used to facilitate communications between two or more individuals: a sender originating a call, and a recipient of either the call or the message. At operation 201, the sender using, for example, a mobile telephony system, places a phone call to the recipient. If the recipient is reached 203, the communication is completed 205. If the recipient has either missed the call or is otherwise unable to answer, the sender leaves a message in the recipient's voice messaging system. The voice messaging system, as outlined above with reference to FIG. 1, determines, at operation 207, whether the mobile telephony system used by the sender has, at 209, an SMS URL mobile device address.

However, an SMS URL address may not be available in a variety of situations. For example, if the sender called from a PSTN line, the telephone number may either not be an SMS-addressable number or a determination cannot be made by the voice messaging system that the number is SMS-addressable. If a determination is made at operation 209 that an SMS URL address is not available, the recipient is notified 211 that only voice mail response is available and the recipient chooses whether to respond 213 to the voice mail message. If the recipient chooses not to respond, the communication is simply ended 215. However, if the recipient chooses to respond to the sender's voice mail message, the recipient leaves a voice mail message 217 with the system. The voice message system then notifies the sender by a direct call-back 219.

If a determination is made at operation 209 that the mobile telephony system used by the sender has an SMS URL, a query to the recipient determines whether the recipient chooses to respond 221. Again, if the recipient chooses not to respond to the sender's voice mail message, the communication is simply ended 215. If the recipient chooses to respond 221, the recipient leaves a voice mail message 223 on the system. At operation 225, the voice mail system then notifies the sender that, via the SMS URL address of the sender, the recipient has replied with a message. The system includes instructions for the sender on a procedure to retrieve the reply message.

Figure 3:
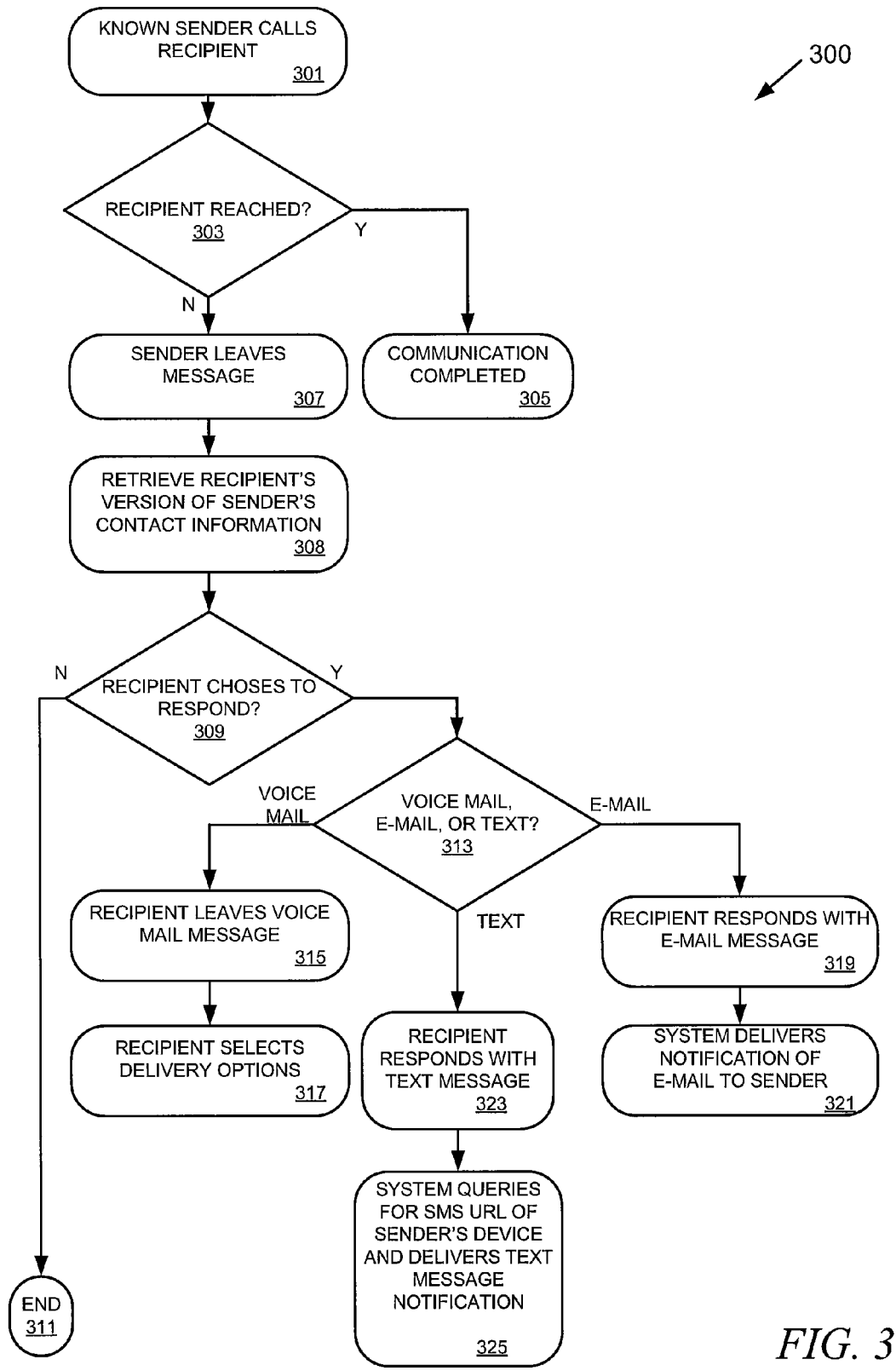
FIG. 3 is a messaging flowchart illustrating an exemplary method by which the messaging system of FIG. 1 is used to facilitate communications between two or more individuals where the sender is known to the recipient.

With reference to FIG. 3, a messaging flowchart 300 illustrates another specific exemplary embodiment of how the messaging system 100 of FIG. 1 facilitates communications. In accordance with this embodiment, the sender is known to the recipient. At 301, the known sender calls the recipient. If the recipient is reached 303, the communication is completed 305. If the recipient has either missed the call or is otherwise unable to answer, at operation 307 the sender leaves a message in the recipient's voice messaging system. The voice messaging system, at operation 308, retrieves the recipient's version of the sender's contact information such as one or more e-mail addresses and a mobile telephone number. In this embodiment, when the sender leaves a message for the recipient, regardless of whether from a mobile telephony system, Internet voice service, or PSTN voice service, the voice messaging system can associate the sender's message with the sender's contact information.

The recipient is notified of the message through, for example, a telephony interface. At operation 309, the recipient then determines whether to respond to the voice mail message. If the recipient chooses not to respond, the communication is simply ended 311. However, if the recipient chooses to respond to the sender's voice mail message, an option is provided to the recipient, at operation 313, of replying to the sender via voice mail, e-mail, or text.

If the recipient chooses to leave a voice mail message at operation 315, the system records the reply message to the sender. The recipient can then select various delivery options 317 including, for example, scheduling when the voice mail message is to be delivered to the sender or whether the recipient chooses to receive an acknowledgment that the voice mail message has been received by the sender. Delivery options can also be selected based upon options supplied by a voice messaging system associated with the sender's telephony device.

Alternatively, the recipient can respond to the sender, at 319, with an e-mail message. The system then delivers notification, at operation 321, of the e-mail message to the sender. The e-mail message may be sent directly to the sender or, alternatively, the system can simply send instructions to the sender outlining procedures on how to retrieve the e-mail message.

In another response alternative at operation 323, the recipient can respond to the sender with a text message. In this case, the voice messaging system conducts a database query at operation 325 to determine the SMS URL address of the sender's telephony device and delivers a text message notification of recipient's response to the sender's device.

Figure 4:
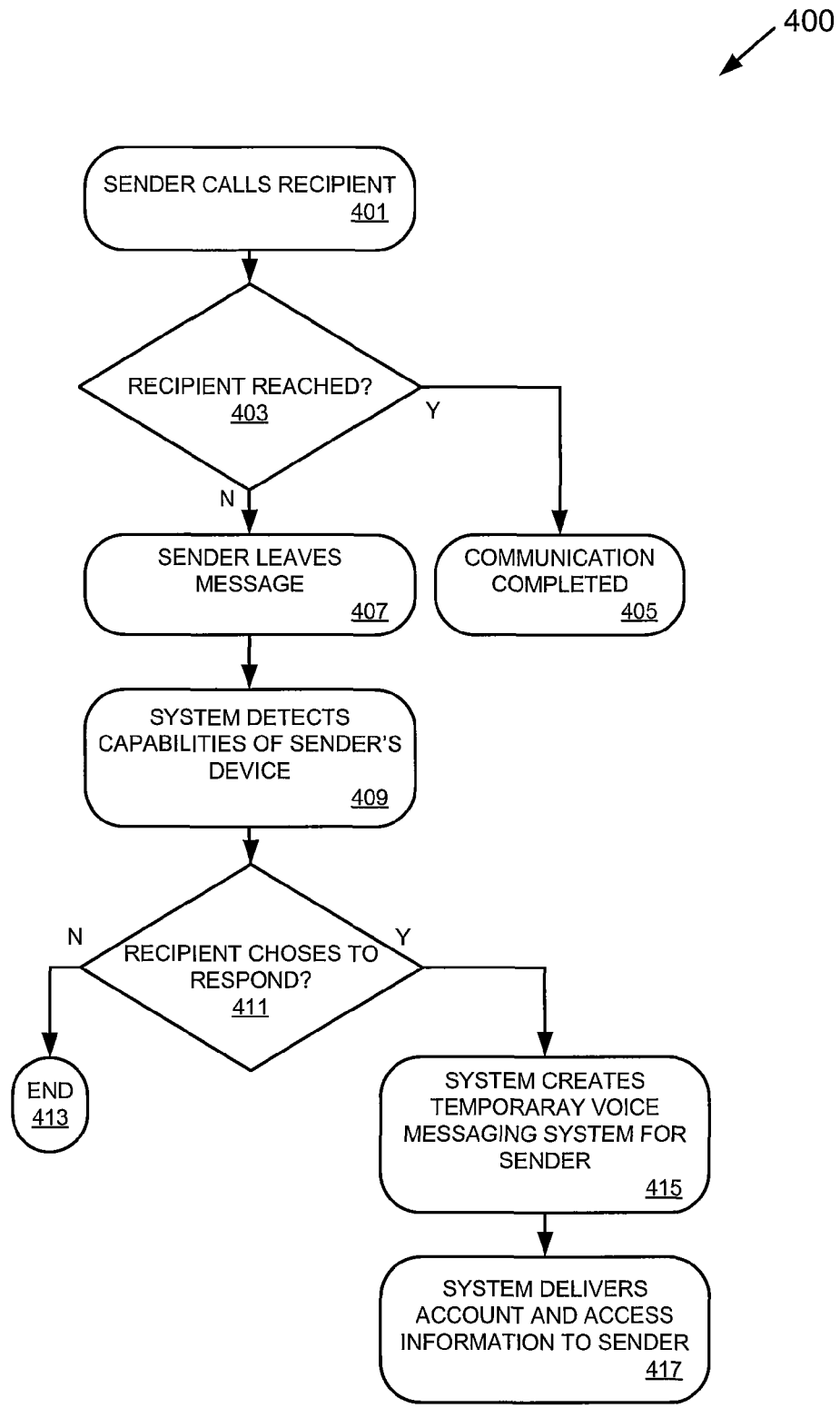
FIG. 4 is a messaging flowchart illustrating an exemplary method by which the messaging system of FIG. 1 is used to facilitate communications between two or more individuals where capabilities of the sender's device are determined by the system.

With reference now to FIG. 4, a messaging flowchart 400 illustrates another specific exemplary embodiment of how the messaging system 100 of FIG. 1 facilitates communications. In accordance with this embodiment, the sender can either be known or unknown to the recipient. At operation 401, the sender calls the recipient. If the recipient is reached 403, the communication is completed 405. If the recipient has either missed the call or is otherwise unable to answer, the sender leaves a message at operation 407 in the recipient's voice messaging system.

Once the sender leaves the message, the system detects the capabilities 409 of the sender's telephony device. Capabilities such as text messaging, e-mail, Internet access, or other non-voice capabilities are determined by accessing various databases associated with the phone number associated with the sender's telephony device as discussed with reference to FIG. 1, above.

Referring back to FIG. 1, the exemplary messaging system 100 searches for address information of the sender to determine the presence of one or more e-mail addresses and the SMS URL database 115 is checked for the SMS address of the sender's mobile device. Based on the presence or absence of e-mail or SMS URL information, the system dynamically allows for a reply feature to be rendered during message retrieval by the recipient, either by PSTN or an Internet connected device.

With reference again to FIG. 4, the recipient is notified of the message through, for example, a telephony interface. The recipient then determines whether to respond 411 to the voice mail message. If the recipient chooses not to respond, the communication is simply ended 413. However, if the recipient chooses to respond to the sender's voice mail message, the recipient can leave a message and the system dynamically creates 415 a temporary voice messaging system for the sender. The reply message and the original message are stored in a thread.

Depending upon the capabilities of the sender's device detected earlier, the voice messaging system sends notification of the reply by either a text message, a call-back to the sender, or by an e-mail notification. The system then delivers 417 account and access information to the sender for retrieval of the reply from the recipient. The sender can then access the temporary voice messaging system account via telephone or the Internet. The sender can retrieve and act upon the message, including creating another reply, storing, or forwarding the message, or starting real-time voice communications with the recipient.

In a variety of embodiments described herein, a recorded reply message from either the sender or the recipient can be transcribed from voice to text. The text version of the reply is then delivered as a component of either a text message or an e-mail notification. In other embodiments, the text version can supplement the voice mail message thereby providing the sender with at least two forms of reply message response from the recipient.

While various embodiments of the present invention are described with reference to assorted implementations and exploitations, it will be understood that these embodiments are illustrative only and that a scope of the present invention is not limited to them. In general, techniques for the messaging system may be implemented with facilities consistent with any hardware system or hardware systems defined herein. Many variations, modifications, additions, and improvements are therefore possible. For example, the message reply sequences, discussed above in various embodiments, can be continued across various networks and multiple mediums and are not limited to a single central or distributed network.

Further, plural instances can be provided for resources, operations, or structures described herein as a single instance. Also, boundaries between various resources, operations, and data stores are somewhat arbitrary, and particular operations are illustrated in a context of specific exemplary configurations to provide clarity to the reader. Other allocations of functionality are readily envisioned and fall within a scope of the various embodiments of the present invention described herein. In general, structures and functionality presented as separate resources in the exemplary configurations can often be implemented as a combined structure or resource. Similarly, structures and functionality presented as a single resource can be implemented as separate resources. These and other variations, modifications, additions, and improvements fall within the scope of the present invention as represented by the appended claims.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 5:
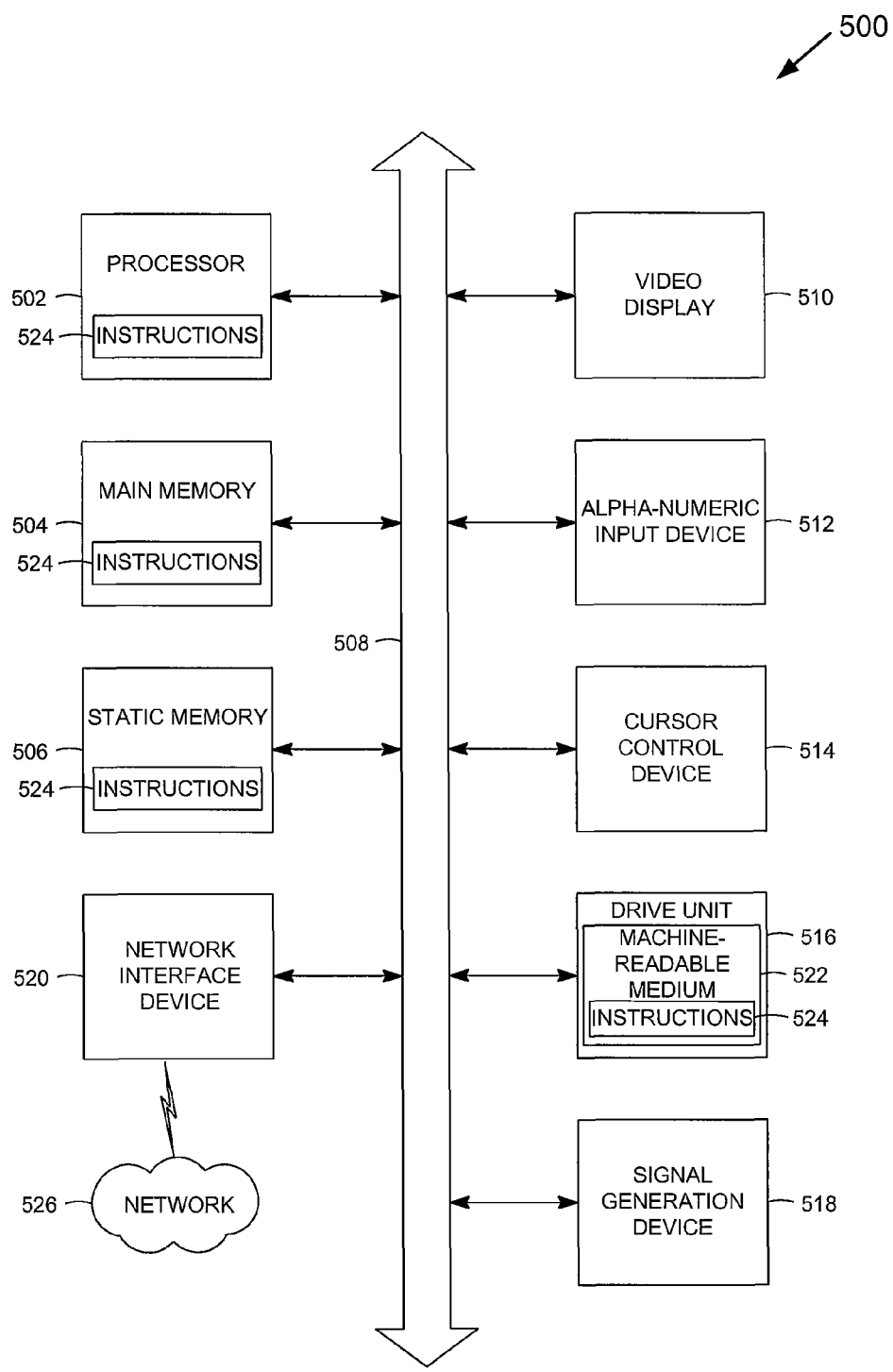
FIG. 5 is a simplified block diagram of a machine in an exemplary form of a computing system within which a set of instructions, for causing the machine to perform any one or more of the methodologies discussed herein, may be executed.

With reference to FIG. 5, an exemplary embodiment extends to a machine in the form of an exemplary computer system 500 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of instructions 524 and data structures (e.g., software) embodying or used by any one or more of the methodologies or functions described herein. The instructions 524 may also reside, completely or at least partially, within the main memory 504 or within the processor 502 during execution thereof by the computer system 500; the main memory 504 and the processor 502 also constituting machine-readable media.

While the machine-readable medium 522 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an embodiment has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which the claims are entitled.

Such embodiments of the inventive subject matter may be referred to herein, individually or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The specification and drawings are, accordingly, to be regarded in an illustrative rather than a restrictive sense.

What is claimed is:

1. A communications system to couple to a telephony network, the communications system to provide a sender, not subscribed to the communications system, with messaging capabilities, the communications system comprising:
   a voice mail server to record a message from the sender and retrieve the message for a recipient that is subscribed to the system; and
   a call processing logic module coupled to the voice mail server and being configured to access a database to determine whether a telephony device of the sender has non-voice capabilities, the call processing logic module being further configured to notify the recipient of the message and to inform the recipient of the capabilities of the sender.

2. The communications system of claim 1, wherein the call processing logic module is further configured to allow either voice retrieval or text retrieval of the message by the recipient.

3. The communications system of claim 1, wherein the call processing logic module is further configured to allow the recipient to respond to the message by either a voice response or a text response depending upon the determination of the non-voice capabilities of the telephony device of the sender.

4. The communications system of claim 1, wherein the processing center is further configured to couple both to an SMS/MMS gateway and the Internet to access a plurality of telephony devices.

5. The communications system of claim 1, further comprising a media server to replay the message to the recipient as at least one of an audio and a text version of the message.

6. The communications system of claim 1, further comprising a secondary database to store additional contact information of the sender that is known to the recipient.

7. The communications system of claim 1, further comprising an application server to establish a temporary account for the sender to allow the sender to access a response to the message, the response being left by the recipient.

8. A method to allow responses to messages in an electronic environment, the method comprising:
   recording a message to a subscribed recipient from a non-subscribed sender;
   accessing a database to make a determination whether a telephony device of the sender has non-voice capabilities;
   notifying the recipient of the message; and
   providing the non-voice capabilities to the recipient to allow a response to the message.

9. The method of claim 8, further comprising establishing a temporary account for the non-subscribed sender.

10. The method of claim 9, further comprising providing instructions to the sender for retrieval of a response left by the recipient.

11. The method of claim 8, further comprising accessing a database to determine whether the telephony device used by the sender has text capabilities.

12. The method of claim 8, further comprising:
   determining whether additional contact information of the sender is known to the recipient, and if the additional contact information of the sender is known;
   associating the additional contact information with the message.

13. The method of claim 8, further comprising allowing the recipient to respond to the message by at least one of voice mail, e-mail, and an SMS text depending on the capabilities of the telephony device.

14. The method of claim 8, further comprising notifying the sender that the recipient has responded to the message.

15. A method to allow responses to messages in an electronic environment, the method comprising:
   recording and storing one or more voice mail messages in a voice mailbox system of a system subscriber;
   notifying the subscriber of the system of the one or more voice mail messages being sent by a telephony device associated with a non-subscriber of the system;
   accessing a database to make a determination of text capabilities of the telephony device of the subscriber;
   establishing a temporary account for the non-subscriber to allow the non-subscriber to access any response received to at least one of the one or more voice mail messages; and
   providing instructions to the non-subscriber for retrieval of the response.

16. The method of claim 15, further comprising determining whether the telephony device of the non-subscriber has non-voice capabilities.

17. The method of claim 16, further comprising allowing the subscriber to respond to the one or more voice mail messages by either text or voice depending upon the capabilities of the telephony device of the non-subscriber.

18. The method of claim 15, further comprising:
   determining that additional contact information of the non-subscriber is known to the subscriber, and based on the determination the additional contact information of the non-subscriber is known;
   associating the additional contact information with the one or more voice mail messages.

19. The method of claim 15, further comprising notifying the non-subscriber that the subscriber has responded to at least one of the one or more voice mail messages.

20. A machine-readable storage medium storing an instruction that, when executed by one or more processors controlling a communications system, causes the system to perform a method to allow responses to messages in an electronic environment, the method comprising:
   recording and storing one or more voice mail messages in a voice mailbox system of a system subscriber;
   notifying the subscriber of the system of the one or more voice mail messages being sent by a telephony device associated with a non-subscriber of the system;
   accessing a database to make a determination of non-voice capabilities of the telephony device of the subscriber;
   establishing a temporary account for the non-subscriber to allow the non-subscriber to access any response received to at least one of the one or more voice mail messages; and
   providing instructions to the non-subscriber for retrieval of the response.

* * * * *

UNITED STATES PATENT AND TRADEMARK OFFICE
CERTIFICATE OF CORRECTION

PATENT NO. : 8,320,533 B2
APPLICATION NO. : 12/393323
DATED : November 27, 2012
INVENTOR(S) : Christopher M. Waters Page 1 of 1

It is certified that error appears in the above-identified patent and that said Letters Patent is hereby corrected as shown below:

In the Drawings:

On sheet 3 of 5, Fig. 3, reference numeral 309, line 1, delete "CHOSES" and insert --CHOOSES--, therefor On sheet 4 of 5, Fig. 4, reference numeral 411, line 1, delete "CHOSES" and insert --CHOOSES--, therefor On sheet 4 of 5, Fig. 4, reference numeral 415, line 2, delete "TEMPORARAY" and insert --TEMPORARY--, therefor Signed and Sealed this
Third Day of September, 2013

Teresa Stanek Rea
*Acting Director of the United States Patent and Trademark Office*